Feb. 10, 1970     L. BALINT     3,494,990
METHOD FOR PRODUCING MOLDED BODIES OF ROTATION BY ROLLING
Filed Dec. 13, 1967     3 Sheets-Sheet 1

INVENTOR
LAJOS BÁLINT

INVENTOR
LAJOS BÀLINT

United States Patent Office 3,494,990
Patented Feb. 10, 1970

3,494,990
METHOD FOR PRODUCING MOLDED BODIES OF ROTATION BY ROLLING
Lajos Balint, Feldkirch, Vorarlberg, Austria, assignor to Hilti Aktiengesellschaft, Schaan, Liechtenstein
Filed Dec. 13, 1967, Ser. No. 690,212
Claims priority, application Austria, Dec. 16, 1966, A 11,630/66
Int. Cl. B28b 3/16, 1/08; B29d 1/00
U.S. Cl. 264—71    4 Claims

ABSTRACT OF THE DISCLOSURE

A method for producing molded bodies of rotation by rolling from blanks is disclosed, in which the blanks are conducted longitudinally through the gap between two rolls having helical molding profiles extending in the same direction and approaching steadily the desired end profile of the molded body of rotation. In accordance with the disclosure, at least one of the two rolls has imparted thereto a vibratory motion perpendicular to the roll axis and relative to the other roll, and this vibratory movement has a frequency of more than 50 c.p.s., with the frequency being dependent on how great a reduction of the cross section is necessary. The amplitude of the vibratory movement is preferably up to about 2 mm.

Background of the invention

It is known to produce molded bodies of rotation by rolling from blanks, preferably of a cylindrical form, with the blanks being conducted longitudinally through the gap between two rolls having helical molding profiles extending in the same direction and approaching steadily the desired end profile of the molded body of rotation. However, when using this method to produce molded bodies of rotation by rolling from blanks, there results the formation of tensions in the blank causing the blank to break up along the axis which extends perpendicularly to the acting forces. For this reason, it has not been possible up to the present to produce molded bodies of rotation, where it was necessary to avoid breaking up of the blank, merely by rolling.

Summary of the invention

This invention relates to the production of molded bodies of rotation by rolling from blanks and, more particularly, to an improved method of and apparatus for such production in which breaking up of the blank about its axis, during the rolling, is effectively prevented.

In accordance with the invention, at least one of the two rotating rolls between which the blank is fed longitudinally performs a vibratory movement perpendicular to the roll axis and with respect to the other roll or rolls. This solution to the problem is based on the finding that tensions in the blank can be influenced favorably, during rolling of the blank, if at least one of the rolls performs such a vibratory movement.

With this method it is possible to produce, by molding, bodies of rotation which up to now have been produced mostly by forging, casting, or free-cutting machining of the blank, and to produce these bodies of rotation by molding in a particularly economical manner by rolling and without cutting. The great precision that can be attained with the invention method renders superfluous any subsequent machining of the molded body of rotation.

While the method of the invention is intended primarily as a cold forming operation, it also can be applied just as well to hot blanks. The blanks need not necessarily have a cylindrical cross section, but can have a cross section deviating from a cylindrical form. Thus, the blanks may have a substantially prismatic form, provided the edge angles are not too small. Thereby, a raw material or blank having the cross section of a regular octagon can be easily processed utilizing the method of the invention.

In further accordance with the invention, an apparatus for performing the invention method is provided and includes at least two rolls driven in the same direction. The circumferences or peripheries of these rolls have worked therein helically a profiling for deforming the blank, with the form of the profiling steadily approaching the desired end profile of the molded body. Also, a vibratory drive is provided which acts on at least one roll. Nearly any type of vibration-producing drive can be used, such as electromagnetic or mechanical vibrators, for example.

The rolls may be cylindrical or may be conical, and preferably are so arranged that the gap therebetween narrows from the entrance side for the blank to the exit side for the blank. This can be attained either by the form of the rolls or by the arrangement of the rolls relative to each other. For example, the rolls can be so arranged that their axes intersect at an acute angle. It is also advantageous to make the positions of the rolls, relative to each other, variable.

If necessary, as for example when using only two rolls, the blank is held laterally by means of supporting elements extending into the roll gap. Furthermore, if necessary, each of the rolls can be rotated separately through suitable gearing.

Accordingly, an object of the present invention is to provide an improved method for producing molded bodies of rotation by rolling from blanks.

Another object of the invention is to provide an improved apparatus for producing molded bodies of rotation by rolling from blanks.

A further object of the invention is to provide such a method in which the blanks are conducted longitudinally through the gap between two or more rolls having helical molding profiles extending in the same direction and steadily approaching the desired end profile of the molded body of rotation, and in which at least one of the rolls is vibrated in a direction perpendicular to its axis.

A further object of the invention is to provide such a method in which breaking up of the blanks along the axes thereof is avoided.

Yet, another object of the invention is to provide such a method in which, when using only two rolls, the blank is held laterally positioned by means of supporting elements extending into the gap between the rolls.

A further object of the invention is to provide such a method in which the precision attained makes superfluous any subsequent machining of the molded body of rotation.

Another object of the invention is to provide such a method which is applicable to cold forming blanks as well as to hot forming blanks.

A further object of the invention is to provide such a method in which the blanks need not necessarily have a cylindrical cross section but may have a prismatic cross section.

Brief description of the drawings

For an understanding of the principles of the invention, reference is made to the following description of typical embodiments thereof as illustrated in the accompanying drawings.

In the drawings.

Description of the preferred embodiments

Figure 1:
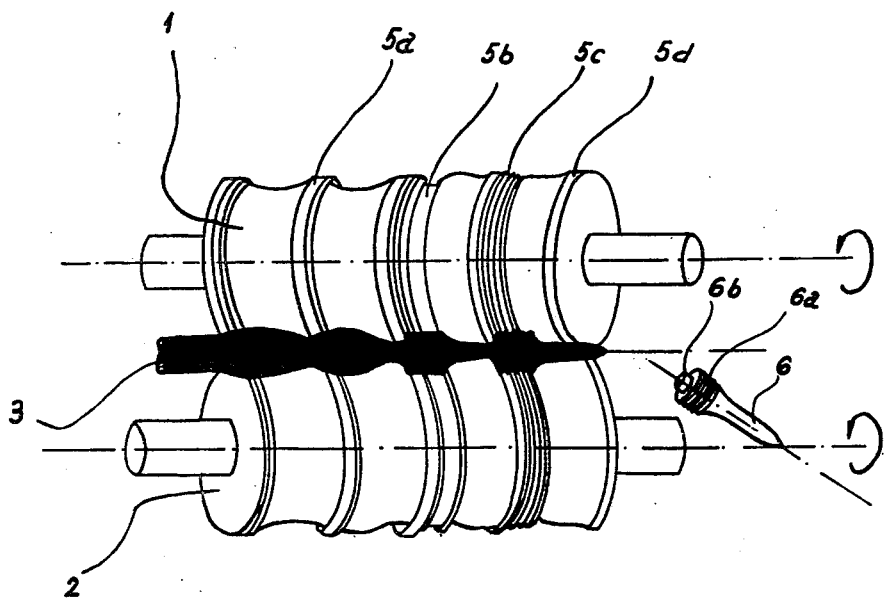
FIG. 1 is a side elevation view of a pair of rolls used in the apparatus of the invention for performing the method of the invention.
Figure 2:
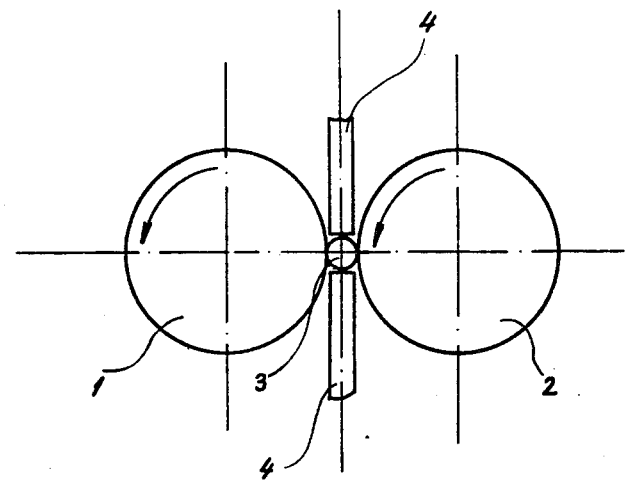
FIG. 2 is a transverse sectional view through the pair of rolls illustrated in FIG. 1.

Referring to FIG. 1, rolls 1 and 2, each having a circular cross section, are illustrated as oriented or positioned so that their longitudinal axes form an acute angle with each other. A blank 3, which is illustrated as being in the form of a cylindrical rod, is passed through the gap between rolls 1 and 2 in a direction longitudinally of the blank. When only two rolls are used, it is necessary to hold blank 3 in the gap between the rolls by the use of corresponding holding tools 4, best shown in FIG. 2 as projecting laterally into the gap between the rolls.

In the method in accordance with the invention, rolls 1 and 2 rotate in the same direction, so that a rotary movement is also imparted to blank 3. By arranging the two rolls at an acute angle to each other, blank 3 is pulled into the longitudinal gap between the rolls and thus moved longitudinally through this gap. If necessary, additional means can be used to promote the longitudinal movement of blank 3.

The profile or configuration on the rolls, which is to impart to the blank the desired form, is applied helically on the circumferences or peripheral surface of the rolls. The profiles extend in the same direction and steadily approach the desired end profile for the blank 3. The entire profile can be arranged on one pair of rolls, or on two pairs of rolls, particularly when the deformation is to be very extensive. The profiles can also be applied on large diameter rolls as a helical surface having a small pitch, or the profiles can constitute helical surfaces having a larger pitch on oblong rolls of a smaller diameter. The particular embodiment selected depends upon, among other factors, the degree of deformation to which the blank is to be subjected, the material to be deformed, and the accuracy to size of the desired end product.

The steady approach of the molding profiles toward each other imposes on the blank a corresponding deformation. Thus, in the rolls shown in FIG. 1, threaded bolts 6 can be produced to form the raw material blank 3. Parts 5a of each profile reduces the diameter of the blank 3. Profiles 5b provide the blank with a thickened portion on which the profiles 5c roll in thread 6a of the bolt. Profiles 5d roll the projection 6b of the bolt which, depending on the setting of the rolls, represents either the connecting piece to the blank or the point at which the finished product is severed from the rod-shaped blank 3.

Figure 3:
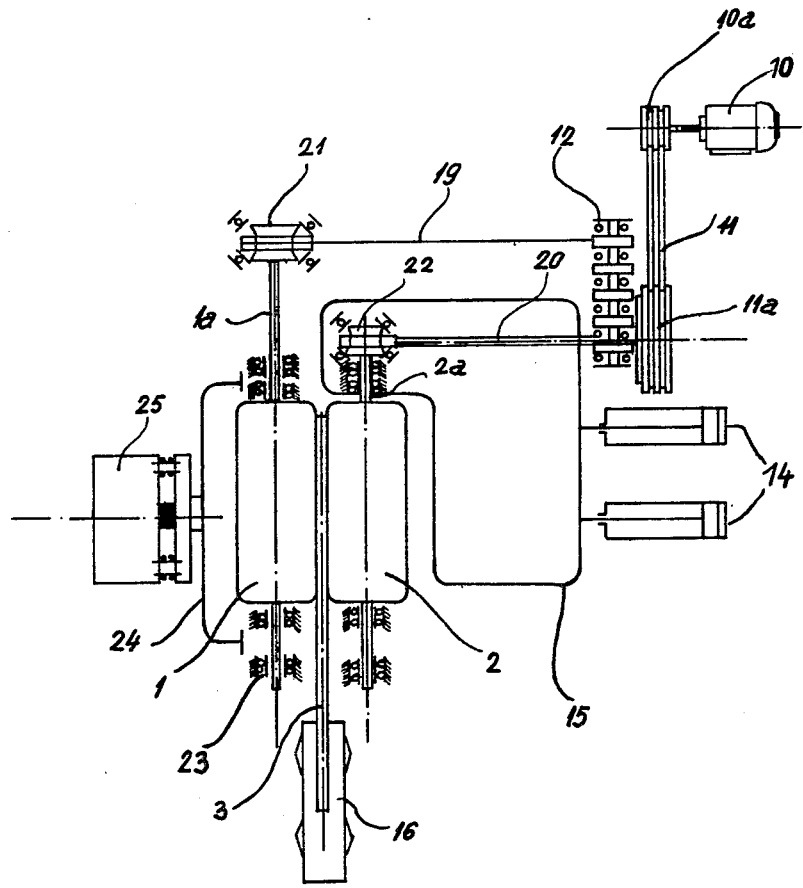
FIG. 3 is a somewhat schematic plan view of apparatus embodying the invention.

A machine or apparatus for performing the invention method is illustrated schematically in FIG. 3, in which the profiled rolls are again designated as 1 and 2. Each roll has a longitudinally extending axle 1a or 2a, respectively, and the axles are journaled in bearings 23. The blank 3 is transported by a carriage 16 to move longitudinally of the longitudinal gap between the rolls 1 and 2. For the sake of clarity, the holding elements 4, shown in FIG. 2, have been omitted from the illustration of FIG. 3.

Rolls 1 and 2 are driven, in the same direction, by an electric motor 10. The drive is effected through a pulley 10a secured on the motor output shaft and connected by V-belts 11 with a transmission 11a. Transmission 11a is connected, through transmission means including gearing 12 and transmission elements 19 and 20, respectively, with transmission wheels 21 and 22 each secured on a respective roll axis 1a or 2a. Through the medium of a hydraulic system 14, connected through means 15 with roll 2, the latter can be shifted laterally or perpendicular to its axis, with respect to roll 1.

In accordance with the invention, a vibrator 25 is connected through suitable means 24, illustrated here as the machine frame, with the axle of roll 1. It is only by vibratory movement of at least roll 1, as illustrated by way of example in FIG. 3, that it is possible to produce molded bodies of rotation, by rolling, without troublesome breaking up of the blanks to be deformed by deforming rolls 1 and 2.

While specific embodiments of the invention have been shown and described in detail to illustrate the application of the principles of the invention, it will be understood that the invention may be embodied otherwise without departing from such principles.

What is claimed is:

1. A method for producing molded bodies of rotation by rolling relatively elongated blanks having cross sections which are at least quasi-circular, said method comprising the steps of rotatably mounting, in spaced relation to provide an elongated gap extending therebetween, at least a pair of profiled rollers having molding profiles extending helically of their circumferences and converging steadily toward the exit end of the gap to provide the desired end profile of the body of rotation at the exit end of the gaps; rotating said rollers in the same angular direction; feeding the blanks longitudinally of the gap for rolling of the blanks by the molding profiles of the rollers; and imparting, to at least one of the rollers, a vibratory movement perpendicular to its longitudinal axis.

2. A method for the production of molded bodies of rotation by rolling blanks, as claimed in claim 1, in which said vibratory movement has a frequency in excess of 50 c.p.s.

3. A method for producing molded bodies of rotation by rolling blanks, as claimed in claim 1, in which said vibratory movement has an amplitude of up to 2 mm.

4. A method of producing molded bodies of rotation by rolling blanks, as claimed in claim 1, in which said vibratory movement has a frequency proportional to the desired reduction in cross section of the blanks.

References Cited

FOREIGN PATENTS 575,434  4/1966  Germany.

ROBERT F. WHITE, Primary Examiner

R. SHEAR, Assistant Examiner

U.S. Cl. X.R.

18—2, 9; 264—175, 310